United States Patent
Yang et al.

(10) Patent No.: US 11,646,021 B2
(45) Date of Patent: May 9, 2023

(54) APPARATUS FOR VOICE-AGE ADJUSTING AN INPUT VOICE SIGNAL ACCORDING TO A DESIRED AGE

(71) Applicant: LG ELECTRONICS INC., Seoul (KR)

(72) Inventors: Siyoung Yang, Seoul (KR); Yongchul Park, Seoul (KR); Sungmin Han, Seoul (KR); Sangki Kim, Seoul (KR); Juyeong Jang, Seoul (KR); Minook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 213 days.

(21) Appl. No.: 16/851,053

(22) Filed: Apr. 16, 2020

(65) Prior Publication Data

US 2021/0142800 A1  May 13, 2021

(30) Foreign Application Priority Data

Nov. 12, 2019 (KR) .......................... 10-2019-0144486

(51) Int. Cl.
*G10L 15/22* (2006.01)
*G10L 15/06* (2013.01)
(Continued)

(52) U.S. Cl.
CPC ................ *G10L 15/22* (2013.01); *G06F 3/14* (2013.01); *G06N 3/0454* (2013.01); *G06N 3/088* (2013.01); *G10L 15/063* (2013.01)

(58) Field of Classification Search
CPC ...... G10L 15/22; G10L 15/063; G10L 21/003; G10L 25/30; G10L 13/033; G10L 15/16; G10L 25/15; G10L 25/90; G10L 2021/0135; G06F 3/14; G06N 3/0454; G06N 3/088; G06N 3/0472; G06N 3/084
See application file for complete search history.

(56) References Cited

U.S. PATENT DOCUMENTS 7,912,719 B2 * 3/2011 Hirose .................. G10L 13/033
                                                 704/260
8,407,053 B2 * 3/2013 Latorre ................... G10L 13/10
                                                 704/260

(Continued)

FOREIGN PATENT DOCUMENTS

KR    10-2019-0104268    9/2019

Primary Examiner — Michael N Opsasnick
(74) Attorney, Agent, or Firm — Lee, Hong, Degerman, Kang & Waimey PC (57) ABSTRACT

According to one embodiment, an apparatus for processing a voice signal includes a display configured to display an image of a user or a character corresponding to the user, a microphone, a speaker configured to output a voice signal of the user, a memory configured to store a trained voice age conversion model, and a processor configured to, based on changing an age of the user or the character displayed on the display, control the display such that the display displays the user or the character corresponding to the changed age. The processor is further configured to determine a first age that is a current age of the user or the character based on the voice signal of the user inputted through the microphone. Accordingly, convenience of a user may be enhanced.

4 Claims, 9 Drawing Sheets

(51) Int. Cl.
*G06N 3/04* (2006.01)
*G06N 3/08* (2006.01)
*G06F 3/14* (2006.01)
*G06N 3/088* (2023.01)

(56) References Cited

U.S. PATENT DOCUMENTS

| | | | |
|---|---|---|---|
| 10,068,557 B1* | 9/2018 | Engel | G06N 3/04 |
| 2013/0013308 A1* | 1/2013 | Cao | G06Q 30/0271 |
| | | | 704/E15.001 |
| 2017/0076714 A1* | 3/2017 | Mori | G10L 13/033 |
| 2018/0204111 A1* | 7/2018 | Zadeh | G06N 3/0454 |
| 2019/0149490 A1* | 5/2019 | Tokuchi | H04L 51/02 |
| | | | 709/206 |
| 2020/0035228 A1* | 1/2020 | Seo | G06F 40/295 |
| 2020/0213680 A1* | 7/2020 | Ingel | G10L 13/00 |
| 2020/0410976 A1* | 12/2020 | Zhou | G10L 13/033 |

* cited by examiner

APPARATUS FOR VOICE-AGE ADJUSTING AN INPUT VOICE SIGNAL ACCORDING TO A DESIRED AGE

CROSS-REFERENCE TO RELATED APPLICATION

Pursuant to 35 U.S.C. § 119(a), this application claims the benefit of earlier filing date and right of priority to Korean Patent Application No. 10-2019-0144486, filed on Nov. 12, 2019, the contents of which are all hereby incorporated by reference herein in their entirety.

BACKGROUND

1. Technical Field

The present disclosure relates to a method for processing a voice signal according to a desired age, and an apparatus to which the method is applied.

2. Description of Related Art

Speech is the most natural means for communication, information transfer, and implementing language. Speech refers to sound uttered by humans that conveys meaning.

Attempts to enable communication between humans and machines through speech have been continuously made. Furthermore, the field of speech information technology (SIT), which is for processing speech information effectively, has made remarkable progress. Accordingly, SIT is becoming more and more widely used in people's lives.

In Korean Patent Application Publication No. 10-2019-0104268 (published on Sep. 9, 2019; hereinafter referred to as 'related art 1'), disclosed is an artificial intelligence apparatus that obtains an original voice signal through a microphone, performs a de-identification process on the obtained original voice signal, and recognizes the de-identified voice signal using a voice recognition model.

However, the artificial intelligence apparatus according to related art 1 recognizes the voice signal, but has a limitation in that it cannot process the voice signal according to the needs of various users.

SUMMARY OF THE DISCLOSURE

The present disclosure is directed to providing an apparatus and a method for adaptively processing voice.

The present disclosure is further directed to providing an apparatus and a method for converting a speaker's voice into a voice of a desired age group.

The present disclosure is still further directed to providing an apparatus and a method for processing a voice signal using artificial intelligence technology.

Aspects of the present disclosure are not limited to the above-mentioned aspects, and other technical aspects not mentioned above will be clearly understood by those skilled in the art from the following description.

An apparatus for processing a voice signal according to one embodiment of the present disclosure may include a receiver configured to receive a voice signal of a user, a memory configured to store a trained voice age conversion model, and a processor configured to apply the trained voice age conversion model to the voice signal of the user received through the receiver to generate a target voice signal estimated to be a voice of a user of a pre-inputted desired age.

A method for processing a voice signal according to another embodiment of the present disclosure may include receiving a voice signal of a user, applying a pre-trained voice age conversion model to the voice signal of the user to generate a target voice signal estimated to be a voice of a user of a pre-inputted desired age, and outputting the generated target voice signal.

An apparatus for processing a voice signal according to another embodiment of the present disclosure may include a display configured to display an image of a user or a character corresponding to the user, a speaker configured to output a voice signal of the user, a memory configured to store a trained voice age conversion model, and a processor configured to control, based on changing an age of the user or the character displayed on the display, the display such that the display displays the user or the character corresponding to the changed age.

The processor may generate the voice signal corresponding to the user or the character of the changed age by using the voice age conversion model, and output the generated voice signal through the speaker.

According to various embodiments of the present disclosure, since voice information corresponding to a desired age group can be outputted, even when voice information on the desired age groups has not been secured, effective use is possible and user convenience can be enhanced.

DETAILED DESCRIPTION

Since various embodiments of the present disclosure may utilize techniques relating to artificial intelligence, artificial intelligence will be generally described below.

Artificial intelligence (AI) refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In the artificial neural network, each neuron may output a function value of the activation function with respect to input signals inputted through the synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

Machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

Reference will now be made in detail to embodiments of the present disclosure, examples of which are illustrated in the accompanying drawings. In the following description of the embodiments of the present disclosure, a detailed description of related arts will be omitted when it is determined that the gist of the embodiments disclosed herein may be obscure.

Terms such as "first," "second," and other numerical terms when used herein do not imply a sequence or order unless clearly indicated by the context. These terms are only used to distinguish one element from another. In addition, terms, which are specially defined in consideration of the configurations and operations of the embodiments, are given only to explain the embodiments, and do not limit the scope of the embodiments.

Figure 1:
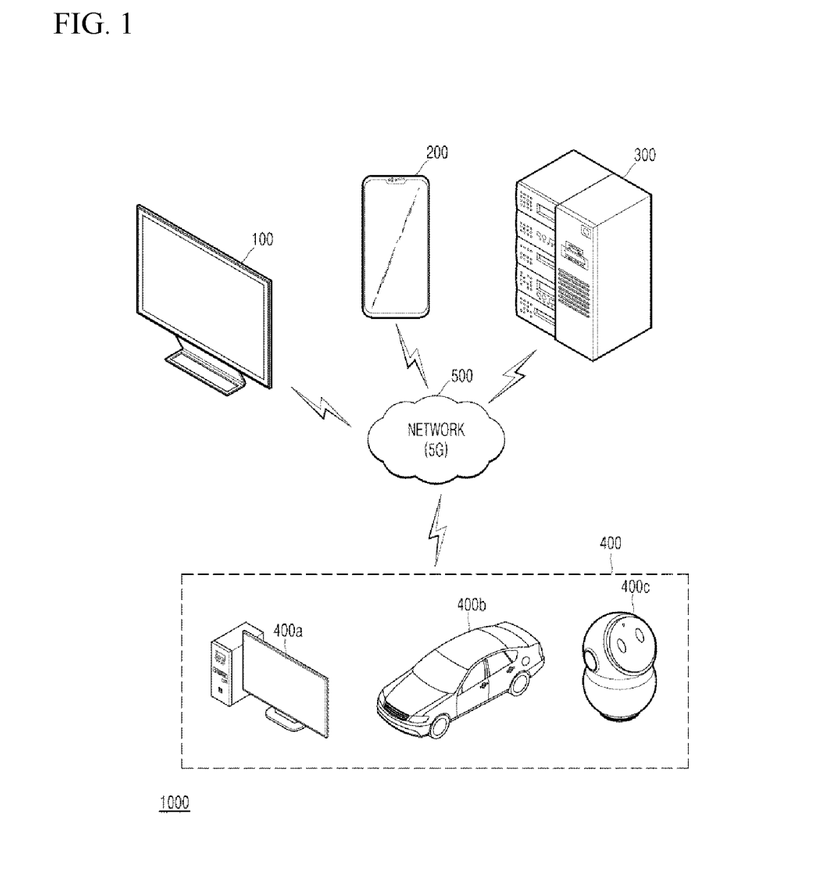
FIG. 1 is a view illustrating a 5G network-based cloud system according to one embodiment of the present disclosure.

FIG. 1 is a view illustrating a 5G network-based cloud system 1000 according to one embodiment of the present disclosure.

Referring to FIG. 1, the cloud system 1000 may include a voice signal processing apparatus 100, a mobile terminal 200, an information providing system 300, various devices 400, and a 5G network 500.

The human voice may be generated by organs such as the vocal cords, the larynx, the nasal cavity, and the lungs. As a human ages, the human body naturally changes, and as a result, the human voice also changes. The human voice is changed by the growth of the body from childhood to adulthood, and by aging from adulthood to old age. In addition, in the case of men, the human voice changes rapidly around the age of puberty.

The voice signal processing apparatus 100 is a device that mechanically performs voice conversion. The voice signal processing apparatus 100 may convert a first voice of a speaker, which is inputted through, for example, a microphone or various voice receivers (input interfaces) for receiving a voice signal, into a second voice. Herein, the first voice may be a voice of the speaker corresponding to a predetermined point in time (or age), and the second voice may be a voice of the speaker at a point in time (or age) which is earlier or later than the point in time of the first voice.

In the present specification, the voice signal processing apparatus 100 is assumed to be a display apparatus 100. However, as alternative or additional embodiments, various electronic devices, communication devices, robots, and the like may be implemented as the voice signal processing apparatus 100.

The voice signal processing apparatus 100 may transmit and receive data to and from servers, various communication terminals, and the like, through the 5G network 500. In particular, the voice signal processing apparatus 100 may perform data communication with the server and terminals by using at least one of enhanced mobile broadband (eMBB), ultra-reliable and low latency communications (URLLC), or massive machine-type communications (mMTC), through the 5G network 500.

eMBB is a mobile broadband service providing, for example, multimedia content and wireless data access. In addition, improved mobile services, such as hotspots and wideband coverage for accommodating the rapidly increasing mobile traffic, may be provided through the eMBB. Through a hotspot, high-volume traffic may be accommodated in an area where user mobility is low and user density is high. Through wideband coverage, a wide and stable wireless environment and user mobility can be secured.

The URLLC service defines more stringent requirements than existing LTE in terms of reliability and transmission delay of data transmission and reception. A 5G service for manufacturing process automation in industrial fields, telemedicine, remote surgery, transportation, and safety, may correspond to a URLLC service.

mMTC is a transmission delay-insensitive service that requires a relatively small amount of data transmission. mMTC enables a much larger number of terminals, such as sensors, than general mobile cellular phones to be simultaneously connected to a wireless access network. In such a case, the price of the communication module of the terminals should be low, and a technology improved to increase power efficiency and save power is required to enable operation for several years without replacing or recharging a battery.

The mobile terminal 200 may communicate with the voice signal processing apparatus 100 through the 5G network 500, and may provide image-based information. The mobile terminal 200 may include mobile devices such as a mobile phone, a smart phone, and a wearable device (for example, a smart watch, a smart glass, or a head mounted display (HMD)).

The information providing system 300 may provide various services to the voice signal processing apparatus 100. The information providing system 300 may access information that is difficult for the voice signal processing apparatus 100 to access. In addition, the information providing system 300 may perform operations related to artificial intelligence that are difficult or take a long time for the voice signal processing apparatus 100 to operate. Accordingly, the information providing system 300 may generate a model related to artificial intelligence, and provide information related thereto to the voice signal processing apparatus 100.

The various devices 400 may include, for example, a personal computer (PC) 400a, an autonomous vehicle 400b, and a home robot 400c. The various devices 400 may be connected to the voice signal processing apparatus 100, the mobile terminal 200, the information providing system 300, and the like, through the 5G network 500 in a wired or wireless manner.

The 5G network 500 may include, for example, a 5G mobile communication network, a local area network, and the Internet, and thus may provide a wired or wireless communication environment for devices.

Figure 2:
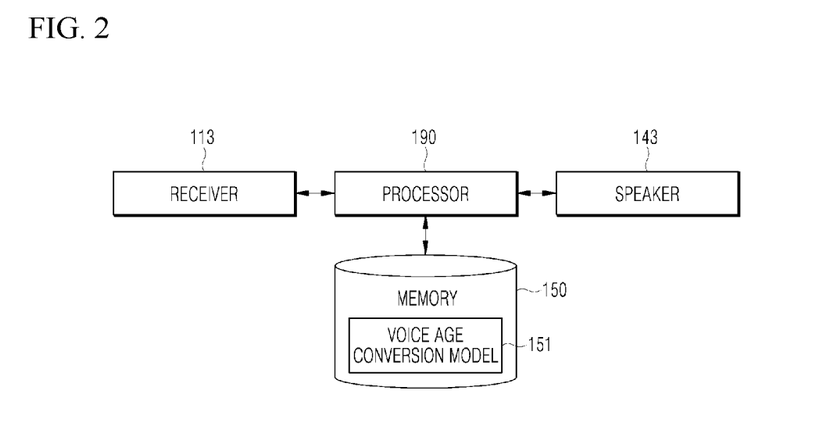
FIG. 2 is a block diagram illustrating a configuration of an apparatus for processing a voice signal according to one embodiment of the present disclosure.

FIG. 2 is a block diagram illustrating a configuration of the voice signal processing apparatus 100 according to one embodiment of the present disclosure.

Referring to FIG. 2, the voice signal processing apparatus 100 may include a receiver 113, a speaker 143, a memory 150, and a processor 190.

First, the receiver 113 may receive a voice signal. In an alternative embodiment, the receiver 113 may be implemented as a receiver included in a transceiver, a microphone, and various input interfaces.

The speaker 143 is a module that outputs sound, and may output a voice signal processed by the processor 190.

The memory 150 stores data supporting various functions of the voice signal processing apparatus 100. The memory 150 may store a plurality of application programs or applications executed in the voice signal processing apparatus 100, and various data and instructions for operating the voice signal processing apparatus 100.

The memory 150 may store information necessary to perform operations using artificial intelligence, machine learning, and an artificial neural network. The memory 150 may store a deep neural network model. The deep neural network model may be used to infer result values for new input data other than the training data. The inferred values may be used as a basis for the judgment to perform an operation. The memory 150 may store clustered data, and may also store embedding vector information that is used in unsupervised learning.

The memory 150 may store a trained voice age conversion model 151. The voice age conversion model 151 may be implemented as a model based on supervised learning or a model based on unsupervised learning.

The processor 190 may apply the voice age conversion model 151 to the voice signal of the user received through the receiver 113. Specifically, the processor 190 may apply the voice age conversion model 151 to the voice signal of the user to generate a target voice signal estimated to be a voice of a user of a pre-inputted desired age. Herein, the voice age conversion model 151 may be a model already completed through a training step.

Hereinafter, the operation of the processor 190 using the voice age conversion model 151 will be described with reference to FIGS. 3 to 5.

Figure 3:
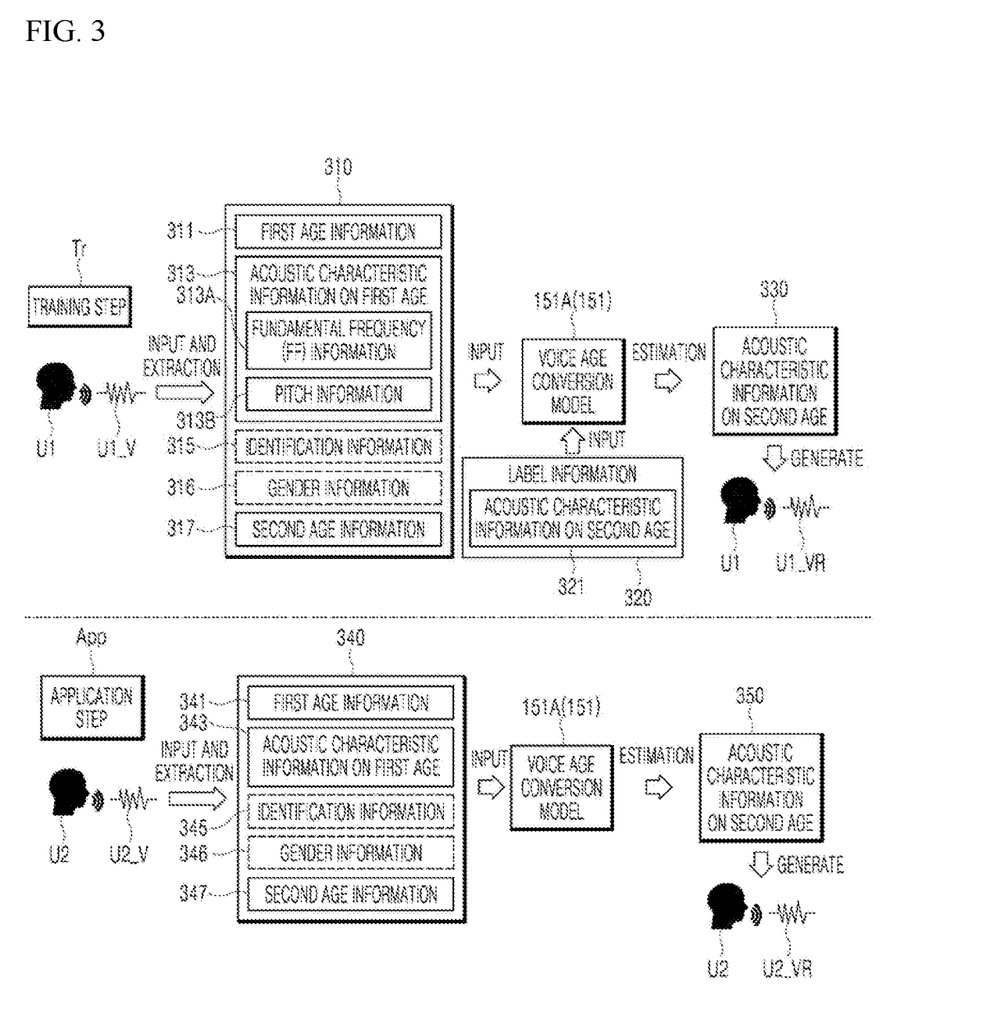
FIG. 3 is a view for illustrating a process of training and applying a voice age conversion model by supervised learning according to one embodiment of the disclosure.

FIG. 3 is a view illustrating a process of training (or learning) and applying the voice age conversion model 151A (151) by supervised learning, according to one embodiment of the present disclosure.

Referring to FIG. 3, the processor 190 may train the voice age conversion model 151A (151) in a training step Tr, and use the trained voice age conversion model 151A (151) in an application step App.

In general, the voice age conversion model 151A (151) may be a trained model that is trained in advance by pair information that includes acoustic characteristic information corresponding to a voice signal of a first age of each of a plurality of trainees and acoustic characteristic information corresponding to a voice signal of a second age.

First, describing in detail the training step Tr, the processor 190 may receive the voice signal of each of the plurality of trainees and extract acoustic characteristic information from the received voice signal. The number of the trainees is not limited, and the more label information, the higher the accuracy of the model.

Referring to a first trainee U1 as a representative example, the processor 190 may receive a voice signal U1_V from the first trainee U1. The voice signal U1_V may be a voice signal at the time of input by the first trainee U1. However, in an alternative embodiment, the processor 190 may set a voice signal at another point in time as a reference age (or reference point in time).

The processor 190 may collect various information corresponding to the voice signal U1_V through the input or the extraction. In addition, the processor 190 may set age information on the first trainee U1 as first age information. Further, the processor 190 may collect input information 310 that includes first age information 311, acoustic characteristic information 313 extracted from the voice signal U1_V, identification information 315, gender information 316, and second age information 317.

Herein, the acoustic characteristic information 313 is characteristic information on a sound extracted from the voice signal U1_V. In an alternative embodiment, the processor 190 may extract the acoustic characteristic information 313 using a discrete wavelet transform (DWT). The extracted acoustic characteristic information may include voice spectrum information. The acoustic characteristic information 313 may include, for example, information on a fundamental frequency that uniquely specifies a voice characteristic of the first trainee U1 and information on pitches that appear in multiples of the fundamental frequency. In an alternative embodiment, the acoustic characteristic information 313 may further include various information that uniquely distinguishes the voice of the user, including tone information, tone color information, and the like.

Herein, the input information 310 may further include the identification information 315 and the gender information 316. The identification information 315 may be used to identify the user. Since particularly in the case of men, the human voice changes rapidly around the age of puberty, the gender information 316 may be used to increase the accuracy of the voice age conversion model 151A (151).

The processor 190 may input label information 320. The label information 320 may include acoustic characteristic information 321 on the second age. The processor 190 may train the voice age conversion model 151A (151) such that the acoustic characteristic information outputted based on the input information 310 follows the acoustic characteristic information 321 on the second age. In such a case, if necessary, error back propagation or gradient descent may be used to minimize the loss function.

The processor 190 may generate and output acoustic characteristic information 330 on the second age. In addition, the processor 190 may convert the acoustic characteristic information 330 into the voice signal U1_VR of the second age using a Griffi-Lim algorithm.

The processor 190 may train the voice age conversion model 151A (151) based on a large number of trainees, including the first trainee U1.

Next, in the application step App, when input information 340 including acoustic characteristic information 343 on the first age that is extracted from a voice signal U2_V of a second trainee U2 is inputted into the voice age conversion model 151A (151), the processor 190 may generate and output the acoustic characteristic information 350 on the second age that corresponds to the inputted second age information 347.

Figure 4:
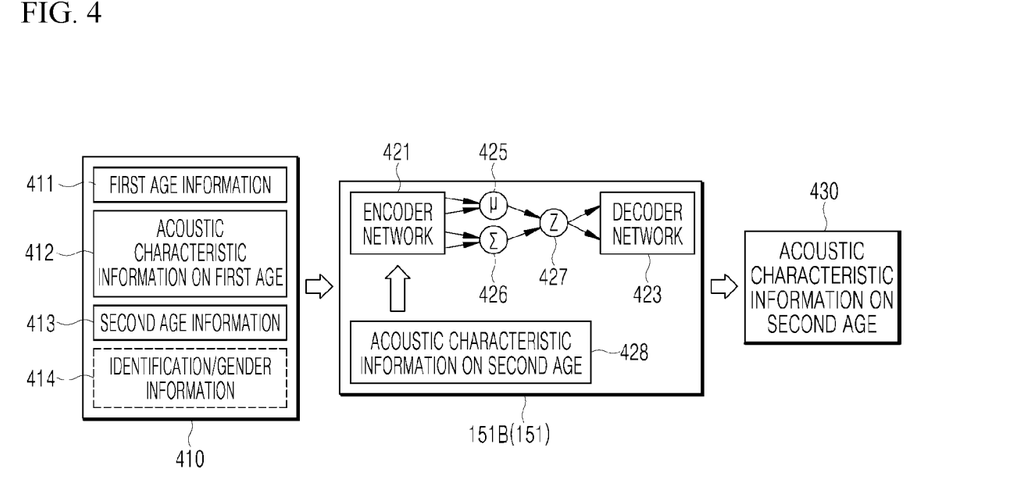
FIGS. 4 and 5 are views for illustrating a process of applying a voice age conversion model generated by unsupervised learning according to one embodiment of the present disclosure.
Figure 5:
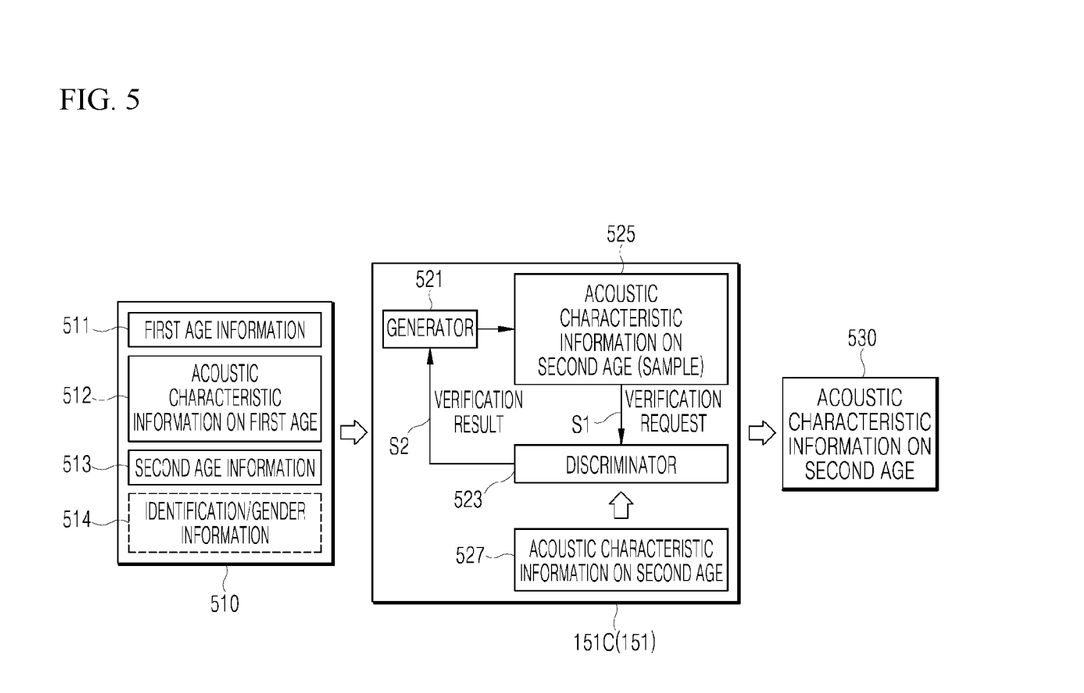

FIGS. 4 and 5 are views for illustrating a process of applying a voice age conversion model generated by unsupervised learning according to one embodiment of the present disclosure. FIG. 4 is a view for describing a variational auto encoder (VAE) model, and FIG. 5 is a view for describing a voice age conversion model implemented as a generative adversarial network (GAN) model.

Referring to FIG. 4, a voice age conversion model 151B (151) may be implemented as a VAE model.

In a training step, the processor 190 may input input information 410 into the voice age conversion model 151B (151).

An encoder network 421 may be trained to receive the acoustic characteristic information on the first age and obtain the acoustic characteristic information on the second age. In such a case, the voice age conversion model 151B (151) may include information (for example, mean μ (425) and variance Σ (426)) on latent variables Z (427) for converting into acoustic characteristic information on the second age through the training. Herein, the latent variables Z (427) may be in the form of a Gaussian function having characteristics corresponding to the acoustic characteristic information on the second age.

The encoder network 421 may include a plurality of convolution layers. A decoder network 423 may also include a plurality of deconvolution layers. The decoder network 423 may input the latent variables Z (427) into the deconvolution layers to output the acoustic characteristic information on the second age. The encoder network 421 may receive acoustic characteristic information 428 on the second age, and derive the latent variables Z (427) based on the received acoustic characteristic information 428. The encoder network 421 and the decoder network 423 may be implemented as a convolutional neural network (CNN).

Referring to FIG. 5, a voice age conversion model 151C (151) may be implemented as the VAE model.

The processor 190 may input input information 510 into the voice age conversion model 151C (151). A generator 521 may generate acoustic characteristic information (sample) 525 on the second age. That is, the generator 521 may generate acoustic characteristic information 525 corresponding to a virtual second age, and transmit, to a discriminator 523, a verification request for the generated acoustic characteristic information 525 (S1).

The processor 190 may verify the sample 525 using the discriminator 523. The discriminator 523 has information related to acoustic characteristic information 527 on the second age. Thus, the discriminator 523 may determine a similarity between the sample 525 and the acoustic characteristic information 527, and then provide a verification result therefor to the generator 521 (S2). In the training step, the processor 190 makes a hypothesis using the generator 521, and may train the voice age conversion model 151C (151) based on the result verified by the discriminator 523.

When the training is completed, the processor 190 may output, through an output device such as the speaker, acoustic characteristic information 530 on the second age that corresponds to the input information 510.

Figure 6:
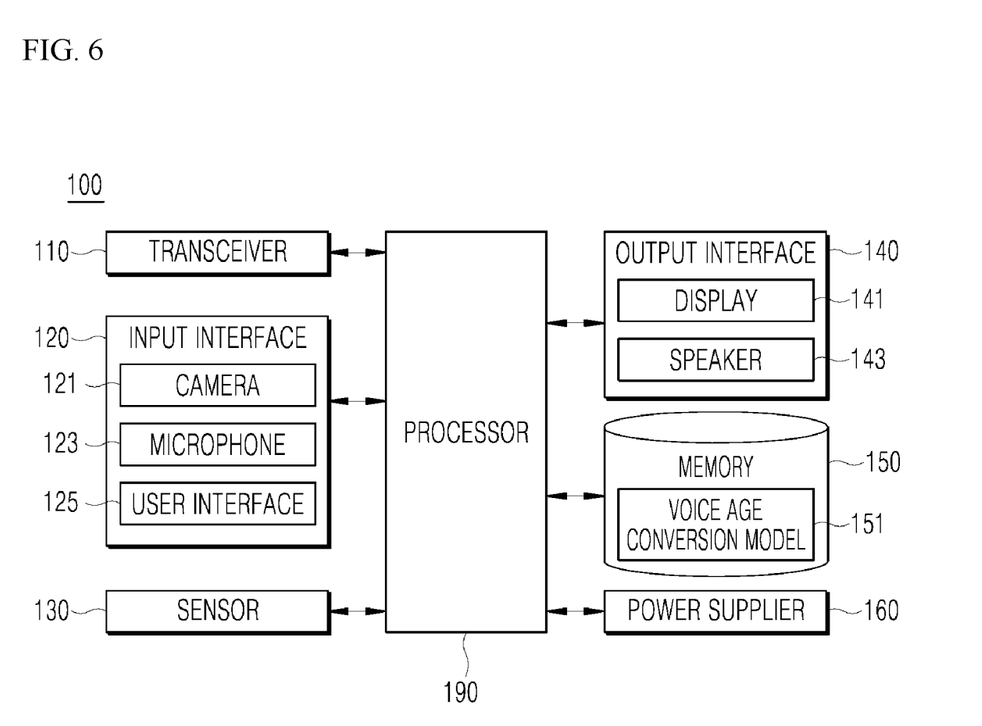
FIG. 6 is a block diagram illustrating a configuration of an apparatus for processing a voice signal according to one embodiment of the present disclosure.

FIG. 6 is a block diagram illustrating a configuration of the voice signal processing apparatus 100 according to one embodiment of the present disclosure.

The voice signal processing apparatus 100 may include a transceiver 110, an input interface 120, a sensor 130, an output interface 140, a memory 150, a power supplier 160, and a processor 190. The components shown in FIG. 6 are not essential to implementing the voice signal processing apparatus 100, and thus the voice signal processing apparatus 100 described herein may have more or fewer components than those listed above.

The transceiver 110 may include a wired/wireless communication module capable of communicating with, for example, the mobile terminal 200 and the information providing system 300.

In an alternative embodiment, the transceiver 110 may be equipped with a module for Global System for Mobile communication (GSM), code division multiple access (CDMA), long term evolution (LTE), 5G, wireless LAN (WLAN), wireless-fidelity (Wi-Fi), Bluetooth™, radio frequency identification (RFID), Infrared Data Association (IrDA), ZigBee, and near field communication (NFC).

The input interface 120 may include a camera 121 for inputting an image signal, a microphone 123 for receiving a voice signal, and a user interface 125 for receiving information inputted from a user. Herein, the camera 121 or the microphone 123 may be regarded as a sensor, and thus a signal obtained by the camera 121 or the microphone 123 may be referred to as sensing data or sensor information.

The input interface 120 may obtain, for example, training data for training a model and input data to be used to obtain an output using the trained model. The input interface 120 may obtain raw input data. In such a case, the processor 190 may extract an input feature for the raw input data by preprocessing the raw input data.

The sensor 130 may obtain at least one of internal information on the voice signal processing apparatus 100, surrounding environment information on the voice signal processing apparatus 100, or user information, using various sensors.

Herein, the sensor 130 may include a satellite-based location sensor, a distance detection sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (lidar) sensor, a barometer sensor, or a radar sensor.

The output interface 140 may generate a visual, auditory, or tactile related output, and may include an optical output interface or the display 141 for outputting visual information, the speaker 143 for outputting auditory information, and a haptic module for outputting tactile information.

Herein, the display 141 may display, under the control of the processor 190, an image of a user or a character that is mappable to the user. In addition, the speaker 143 may output the voice signal of the user.

The memory 150 stores data supporting various functions of the voice signal processing apparatus 100. The memory 150 may store the plurality of application programs or applications executed in the voice signal processing apparatus 100, and various data and instructions for operating the voice signal processing apparatus 100.

In addition, the memory 150 may store information necessary to perform operations using artificial intelligence, machine learning, and an artificial neural network. The memory 150 may store the deep neural network model. The deep neural network model may be used to infer result values for new input data other than training data. The inferred values may be used as the basis for a judgment to perform an operation. The memory 150 may store clustered data, and may also store embedding vector information that is used in unsupervised learning.

The memory 150 may store the voice age conversion model 151. The voice age conversion model 151 may store, as big data, a tendency of the acoustic characteristic information extracted from the voice. When the voice age conversion model receives information on a first point in time, voice information corresponding to the first point in time, and information on a second point in time, the voice age conversion model may convert the voice information corresponding to the first point in time into the voice information corresponding to the second point in time. For example, when the voice age conversion model receives voice information corresponding to a speaker's childhood and information on a particular point in time of the speaker's old age, the voice age conversion model may generate voice information corresponding to the particular point in time of the old age.

The memory 150 may store voice information on various users in the form of big data. The processor 190 may generate an artificial intelligence model by using the stored voice information in the form of big data, and may improve performance by using the generated artificial intelligence model.

Under the control of the processor 190, the power supplier 160 receives power from an external power source and an internal power source, and supplies the power to each component of the voice signal processing apparatus 100. The power supplier 160 includes a battery which may be a built-in battery or a replaceable battery. The battery may be charged via a wired or wireless charging method, and the wireless charging method may include a magnetic induction method or a magnetic resonance method.

The processor 190 is a module that controls the components of the voice signal processing apparatus 100, and may include one or more processors. The processor 190 may refer to a hardware-embedded data processing device having a physically structured circuit to execute functions represented as instructions or codes included in a program. Examples of such hardware-embedded data processing device may include, but are not limited to, processing devices such as a microprocessor, a central processing unit (CPU), a processor core, a multiprocessor, an application-specific integrated circuit (ASIC), and a field programmable gate array (FPGA).

The processor 190 may be configured to, based on changing the age of the user or the character displayed on the display 141, control the display 141 such that the display 141 displays a user or a character corresponding to the changed age.

Instructions to change the age may be executed by an application capable of controlling the display 141, the speaker 143, and the microphone 123.

The processor 190 may generate a voice signal corresponding to the user or the character of the changed age by using the voice age conversion model 151, and output the generated voice signal through the speaker 143.

The voice age conversion model 151 may be a model that is based on supervised learning or unsupervised learning, and may be generated as a VAE model or a GAN model as described above. The above descriptions of FIG. 2 may also be applied to the voice signal processing apparatus 100, so a detailed description thereof will be omitted. In addition, the voice age conversion model 151 may be generated using a sequence to sequence (Seq2Seq) algorithm and an attention technique, but the embodiments are not limited thereto.

Hereinafter, the operations of the voice signal processing apparatus according to one embodiment of the present disclosure will be described with reference to FIGS. 7 and 8.

Figure 7:
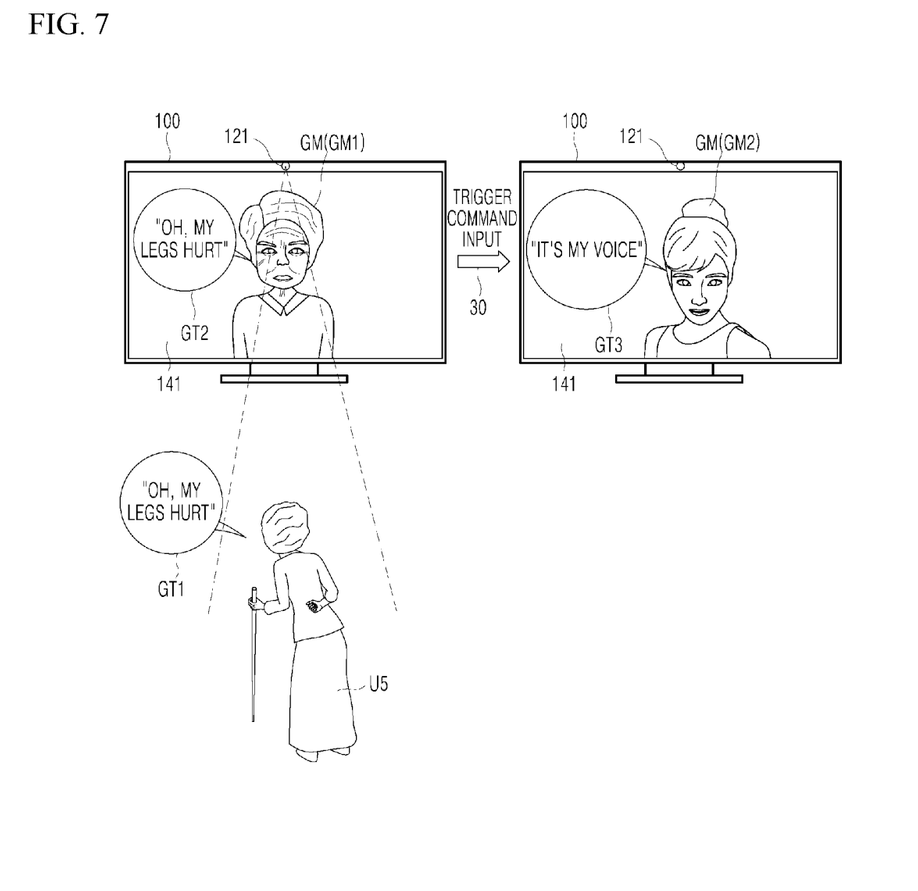
FIGS. 7 and 8 are views for illustrating an operation of an apparatus for processing a voice signal according to one embodiment of the present disclosure.

Referring to FIG. 7, the voice signal processing apparatus 100 may launch an application that is capable of controlling the camera 121, the display 141, and the speaker 143. The contents described in FIGS. 7 and 8 may be performed through the application. Reference is made to the above-mentioned reference numerals.

The voice signal processing apparatus 100 may include the camera 121 for photographing a user U5 (grandmother). The voice signal processing apparatus 100 may display the user U5 as a user image GM (GM1) on the display 141. The user image GM (GM1) may be an image generated by photographing the user U5 using the camera 121.

The user U5 may make a spoken utterance of "Oh, my legs hurt" GT1. Then, the voice signal processing apparatus 100 may receive a voice signal related to the spoken utterance GT1 through the microphone 123, and then output voice information of "Oh, my legs hurt" GT2 through the speaker 143.

When a trigger command is inputted (30), the processor 190 may perform control corresponding to the trigger command. Herein, the trigger command may be a command to change the user image GM (GM1) on the display 141 to a predetermined age.

When the voice signal processing apparatus 100 receives the trigger command (30), the voice signal processing apparatus 100 may display an appearance GM (GM2) of the user U5 on the display 141, and output converted voice GT3 through the speaker 143, based on a pre-inputted age. The appearance GM (GM2) may be an image previously stored in the voice signal processing apparatus 100, or may be an image rendered based on an image received from the information providing system 300.

In an alternative embodiment, the voice signal processing apparatus 100 may receive information on the second age that is the changed desired age, and then output, through the speaker 143, a voice signal corresponding to the second age based on the voice age conversion model 151. (For example, the information on the second age may be received via the microphone or the user interface, or may be stored in advance).

In addition, when the voice signal processing apparatus 100 receives the voice signal of the user through the microphone 123, the voice signal processing apparatus 100 may estimate the age of the received voice signal and then determine the estimated age as the first age that is the current age. In an alternative embodiment, the processor 190 may be implemented to explicitly receive the first age.

Figure 8:
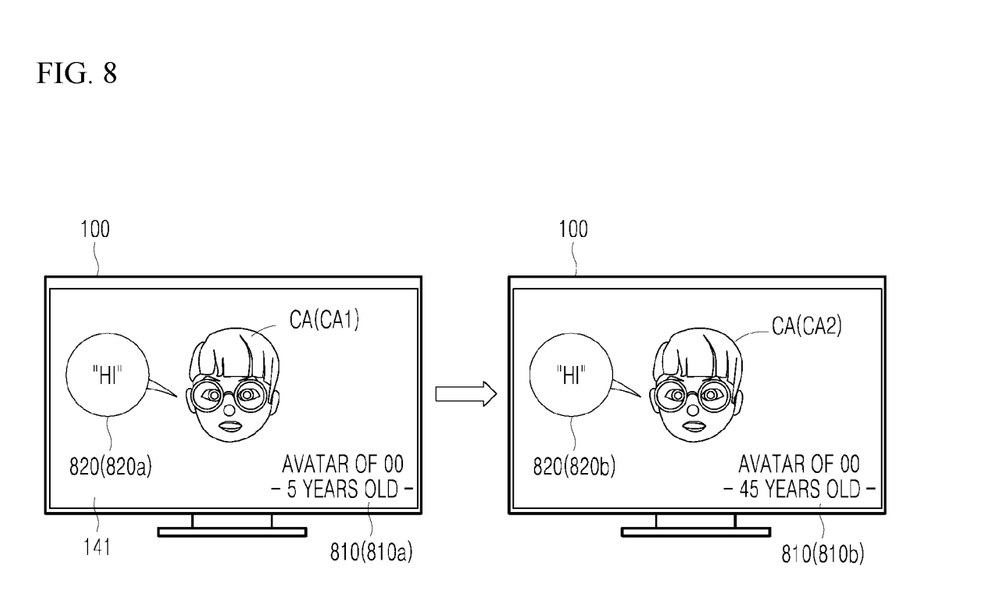

When the voice signal processing apparatus 100 receives, through the microphone 123, a command to change the age of the user U5 or the character (for example, CA in FIG. 8)

corresponding to the user U5 from the first age to the second age, the voice signal processing apparatus 100 may control the display 141 such that the display 141 displays the image corresponding to the second age, and may control the speaker 143 such that the speaker 143 outputs the voice signal corresponding to the second age.

Referring to FIG. 8, the voice signal processing apparatus 100 may display, on the display 141, a character CA (CA1) corresponding to a user. In addition, the voice signal processing apparatus 100 may output a spoken utterance 820 (820a) of the character CA (CA1) through the speaker 143.

When the voice signal processing apparatus 100 receives a command to output a voice converted into the predetermined age, the voice signal processing apparatus 100 may output an appearance CA (CA2) and a voice signal 820 (820b) that reflect the converted voice.

Figure 9:
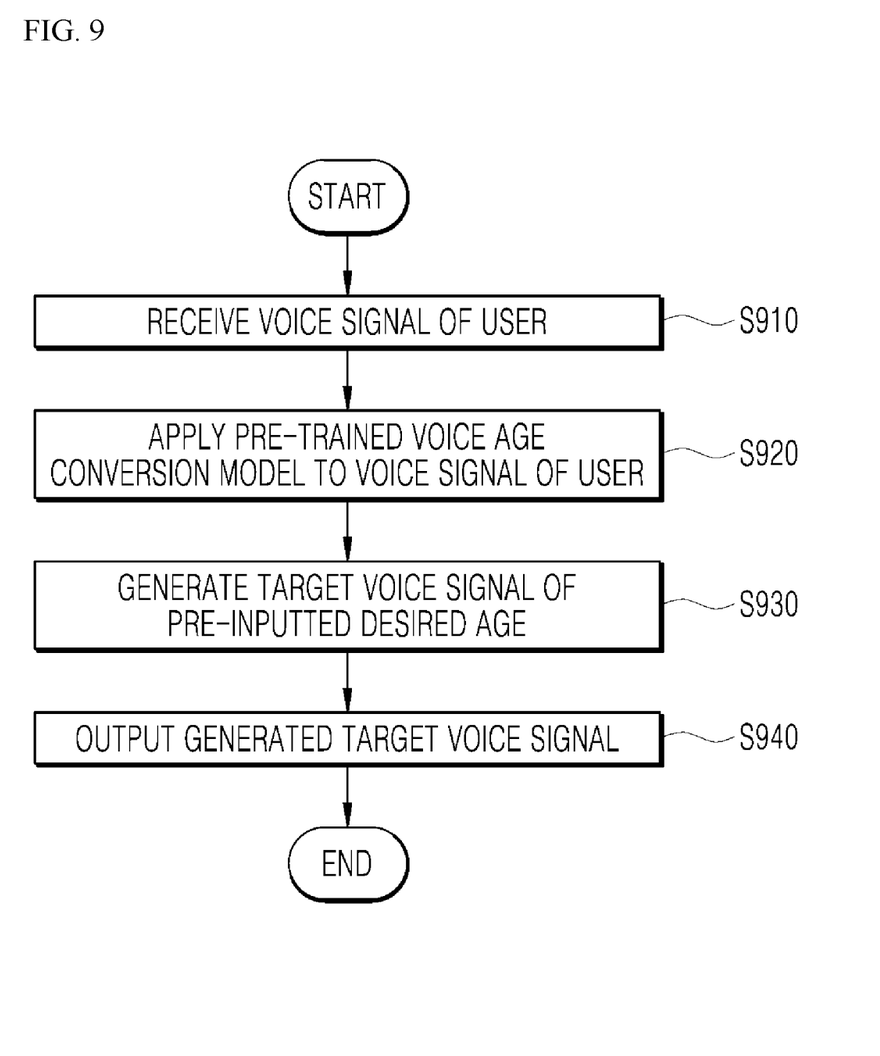
FIG. 9 is a flow chart illustrating a method of operating an apparatus for processing a voice signal according to one embodiment of the present disclosure.

FIG. 9 is a flow chart for describing the operation of the voice signal processing apparatus 100 according to one embodiment of the present disclosure.

First, the voice signal processing apparatus 100 receives the voice signal of the user (S910).

Next, the voice signal processing apparatus 100 applies the pre-trained voice age conversion model to the voice signal of the user (S920).

Herein, the voice age conversion model may be a model based on supervised learning or unsupervised learning, and may be a trained model trained in advance by the pair information that includes the voice characteristic information corresponding to the voice signal of the first age and the voice characteristic information corresponding to the voice signal of the second age.

Thereafter, the voice signal processing apparatus 100 generates a target voice signal of the pre-inputted desired age (S930).

Thereafter, the voice signal processing apparatus 100 outputs the generated target voice signal (S940).

The present disclosure described above may be implemented as a computer-readable code in a medium on which a program is recorded. The computer-readable medium includes all types of recording devices in which data readable by a computer system can be stored. Examples of the computer-readable medium may include a hard disk drive (HDD), a solid state disk (SSD), a silicon disk drive (SDD), a ROM, a RAM, a CD-ROM, a magnetic tape, a floppy disk, an optical data storage device, and the like. Further, the computer may include the processor 190 of the voice signal processing apparatus 100.

In the foregoing, while specific embodiments of the present disclosure have been described for illustrative purposes, the scope or spirit of the present disclosure is not limited thereto, it will be understood by those skilled in the art that various changes and modifications may be made to other specific embodiments without departing from the spirit and scope of the present disclosure. Therefore, the scope of the present disclosure should be defined not by the above-described embodiments but by the technical idea defined in the following claims.

What is claimed is:

1. An apparatus for processing a voice signal comprising:
    a display configured to display an image of a user or a character corresponding to the user;
    a microphone;
    a speaker configured to output a voice signal of the user;
    a memory configured to store a trained voice age conversion model; and
    a processor configured to, based on changing an age of the user or the character displayed on the display, control the display such that the display displays the user or the character corresponding to the changed age,
    wherein the trained voice age conversion model is trained using supervised learning,
    wherein the processor is further configured to generate a voice signal corresponding to the user or the character of the changed age by using the trained voice age conversion model, and output the generated voice signal through the speaker,
    wherein the processor is further configured to determine a first age that is a current age of the user or the character based on the voice signal of the user inputted through the microphone,
    wherein the trained voice age conversion model is pre-trained in a training step by using pair information that comprises acoustic characteristic information corresponding to a voice signal of a first age of each of a plurality of trainees and acoustic characteristic information corresponding to a voice signal of a second age of each of a plurality of trainees, wherein the trained voice age conversion model receives identification information and gender information on each of a plurality of trainees in the training step, wherein the acoustic characteristic information comprises tone information, tone color information, fundamental frequency information, and pitch information that are extracted from a voice of each of the plurality of trainees.

2. The apparatus according to claim 1,
    wherein the processor is further configured to:
    cause a display, on the display, of an image of the user or the character corresponding to the first age; and
    output, through the speaker, a voice signal of the user corresponding to the first age.

3. The apparatus according to claim 2, wherein the processor is further configured to:
    launch a predetermined application that causes the image of the user or the character to be outputted on the display; and
    set a second age through the predetermined application, wherein the second age is a desired age of the user or the character.

4. The apparatus according to claim 3, wherein the processor is further configured to:
    based on a command to change the age of the user or the character from the first age to the second age being inputted through the microphone or the predetermined application;
    control the display such that the display displays an image corresponding to the second age; and
    control the speaker such that the speaker outputs a voice signal corresponding to the second age.

* * * * *